Figure 1:
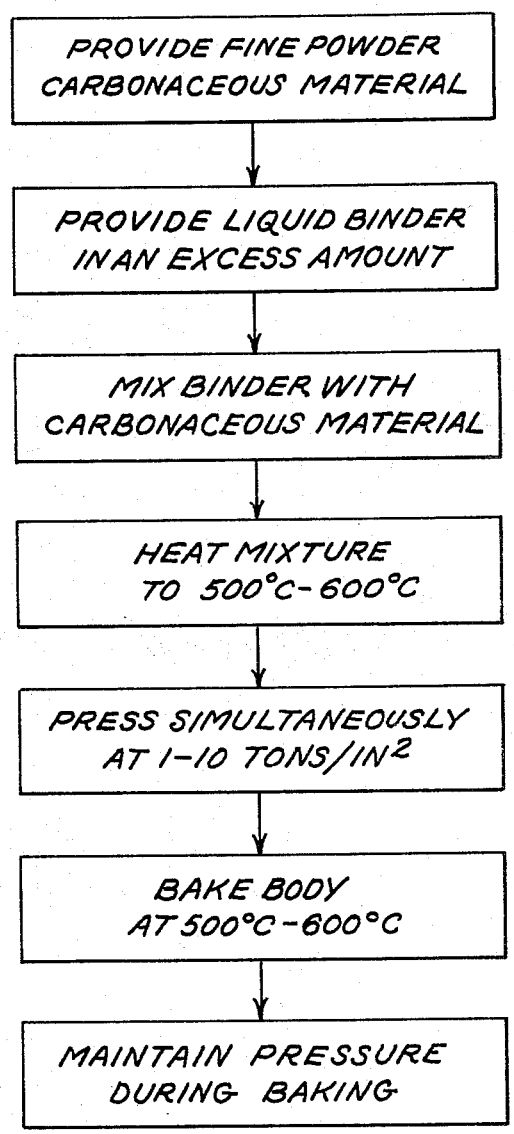

Nov. 1, 1966 — E. R. STOVER — 3,283,040
METHOD OF FORMING A CARBON BODY
Filed May 28, 1965

CARBON BODY

Inventor:
Edward R. Stover,
by Paul R. Webb, II
His Attorney.

3,283,040
METHOD OF FORMING A CARBON BODY
Edward R. Stover, Niskayuna, N.Y., assignor to General
Electric Company, a corporation of New York
Filed May 28, 1965, Ser. No. 459,674
2 Claims. (Cl. 264—29)

This application is a continuation-in-part of my copending patent application, Serial No. 112,238 filed May 24, 1961, and assigned to the same assignee as the present application.

This invention relates to methods of forming carbon bodies and more particularly to methods of forming high density carbon bodies.

Carbon bodies are useful in brushes, seal rings, and ablation-resistant surfaces. While fine carbon powder has been employed to form a carbon body, this powder when heated to a temperature in the range of 1600° C. to 2600° C. does not convert to well-formed graphite crystals as readily as many other carbonaceous raw materials. Such bodies containing fine carbon powder are characterized by higher strengths, hardnesses and elastic moduli than are found in graphite bodies made from coke at similar density levels. However, a serious problem exists in employing fine carbon powder in carbon bodies in that this powder is difficult to compress to flaw-free compacts of high density prior to sintering. If a lubricant is used, its removal after compaction may create deleterious voids. Thus, it would be desirable to produce higher density carbon bodies with fine carbon powders.

It is an object of my invention to provide a method of forming higher density carbon bodies.

It is another object of my invention to provide a method of forming higher density carbon bodies with fine powder carbonaceous material selected from the group consisting of lampblack, furnace black, and carbon black.

It is a further object of my invention to provide a method of forming higher density carbon bodies wherein a fine powder carbonaceous material and a binder are employed.

In carrying out my invention in one form, a method of forming a carbon body comprises providing a fine powder carbonaceous material selected from the group consisting of lampblack, furnace black and carbon black, providing binder in liquid state in excess of an amount required to fill the interstices between the solid particles of such a compacted carbonaceous material, mixing the binder with the carbonaceous material to form a mixture, heating the mixture to a temperature in the range of 500° C. to 600° C., pressing simultaneously the mixture at a pressure in the range of one ton per square inch to ten tons per square inch to form a body, baking the body at a temperature in the range of 500° C. to 600° C. to remove the excess of binder as volatile constituents, and maintaining the pressure during the baking.

Figure 2:

These and various other objects, features and advantages of the invention will be better understood from the following description taken in connection with the accompanying drawing in which:

FIGURE 1 is a diagrammatic illustration of a method of forming a carbon body embodying my invention; and FIGURE 2 is a sectional view of a carbon body made in accordance with my method.

In FIGURE 1 of the drawing, there is shown a diagrammatic illustration of a method of forming a carbon body embodying my invention. This illustration discloses the steps of the method which comprises providing fine powder carbonaceous material, providing liquid binder in an excess amount, mixing the binder with the carbonaceous material, heating the mixture to a temperature range of 500° C. to 600° C., pressing simultaneously the mixture at a pressure of between one and ten tons per square inch, baking the body at 500° C. to 600° C., and maintaining the pressure during the baking.

In FIGURE 2 of the drawing, there is shown a sectional view of a carbon body embodying my invention which is made in accordance with the method illustrated in FIGURE 1.

I found unexpectedly that a carbon body was produced which had superior density, microstructure and strength. I found further that a method of forming such a superior carbon body comprises providing a fine powder carbonaceous material selected from the group consisting of lampblack, furnace black and carbon black, providing binder in liquid state in excess of an amount required to fill the interstices between the solid particles of such a compacted carbonaceous material, mixing the binder with said carbonaceous material to form a mixture, heating the mixture to a temperature in the range of 500° C. to 600° C., pressing simultaneously the mixture at a pressure in the range of one ton per square inch to ten tons per square inch to form a body, baking the body at a temperature in the range of 500° C. to 600° C. to remove the excess of binder as volatile constituents, and maintaining the pressure during the baking.

In my method of forming a superior carbon body, I found that a fine powder carbonaceous material selected from the group consisting of lampblack, furnace black and carbon black should be employed. I found further that it was necessary to provide a binder in liquid state in excess of an amount required to fill the interstices between the solid particles of such a carbonaceous material subsequent to its compaction to highest packing density. A normal amount of binder is an amount which will fill the interstices between the solid particles with binder in the liquid state when the solid particles have been compacted to highest packing density. An excess amount of binder which I employ in my method is that amount of binder which must be removed subsequently during the hot consolidation step so that the final body will have a maximum of highest packing density. The binder is mixed with the carbonaceous material to form a mixture.

I found that the mixture should then be heated to a temperature in the range of 500° C. to 600° C. while the mixture is pressed simultaneously at a pressure in the range of one ton per square inch to ten tons per square inch to form a body. I found then that the body should be baked at a temperature range of 500° C. to 600° C. while the above pressure is maintained and the excess of the binder as volatile constituents is removed. I found that the combination of the above steps provides a method of forming a carbon body which has a high density prior to sintering.

Several examples of method of forming higher density carbon bodies in accordance with the present invention are as follows:

EXAMPLE I

Fifty-four weight percent of a fine powder carbonaceous material of lampblack was mixed with 46 weight percent of coal tar pitch, an excess amount of coal tar pitch, to form a mixture which was pressed initially into a mold under a pressure of 30 tons per square inch at 30° C. After pressing, the density was 1.47 grams per cubic centimeter. The mixture was heated to a temperature of 600° C. while the mixture was pressed simultaneously at a pressure of one ton per square inch to form a body. The body was baked at 600° C. for two hours to remove the excess of binder as volatile constituents while the pressure of one ton per square inch was maintained. The resulting carbon body was fired subsequently in vacuum for three hours at 1700° C. and for three additional hours at 2000° C. After the baking step, the body exhibited a density of 1.51 grams per cubic centimeter and a modulus of rupture of 5180 pounds per square inch. Subsequent to vacuum firing, the body exhibited a density of 1.71 grams per cubic centimeter and a modulus of rupture of 7960 pounds per square inch.

EXAMPLE II

Fifty-four weight percent of a fine powder carbonaceous material of lampblack was mixed with 46 weight percent of coal tar pitch, an excess amount of coal tar pitch, to form a mixture containing a weight percent of binder material at least 85 percent as great as the weight percent of powdered carbonaceous material. This mixture was pressed initially into a mold under a pressure of ten tons per square inch at 30° C. After pressing, the density was 1.37 grams per cubic centimeter. The mixture was heated to a temperature of 600° C. while the mixture was pressed simultaneously at a pressure of ten tons per square inch to form a body. The body was baked at 600° C. for two hours to remove the excess of binder as volatile constituents while the pressure of ten tons per square inch was maintained. The resulting carbon body was fired subsequently in vacuum for three hours at 1700° C. and for three additional hours at 2000° C. After the baking step, the body exhibited a density of 1.57 grams per cubic centimeter. After vacuum firing, the body exhibited a density of 1.70 grams per cubic centimeter and a modulus of rupture of 10,250 pounds per square inch.

While other modifications of this invention and variations of method which may be employed within the scope of the invention have not been described, the invention is intended to include such that may be embraced within the following claims.

What I claim as new and desire to secure by Letters Patent of the United States is:

1. In a method for preparing a baked carbonaceous mass for the production of a graphite body wherein a mixture containing powdered carbonaceous material and carbonaceous binder is heated to and baked at elevated temperatures during the simultaneous application of pressure thereto, the improvement comprising:
    (a) using a weight percent of carbonaceous binder of at least about 0.85 times the weight percent of powdered carbonaceous material, and
    (b) maintaining a pressure of at least about 10 tons per square inch during the baking step.
2. The improvement substantially as recited in claim 1 wherein the powdered carbonaceous material is lampblack and the carbonaceous binder is coal tar pitch.

References Cited by the Examiner
UNITED STATES PATENTS

| 1,899,064 | 2/1933 | Storey et al. | 264—105 |
| 2,997,744 | 8/1961 | Stoddard et al. | 264—29 |

FOREIGN PATENTS 742,521  12/1955  Great Britain.

References Cited by the Applicant
UNITED STATES PATENTS

| 1,899,064 | 2/1933 | Storey et al. |
| 2,148,133 | 2/1939 | Beuscher et al. |
| 2,799,912 | 7/1957 | Greger. |
| 2,997,744 | 8/1961 | Stoddard et al. |

FOREIGN PATENTS 742,251  12/1955  Great Britain.

ROBERT F. WHITE, *Primary Examiner.*

J. A. FINLAYSON, *Assistant Examiner.*